(12) United States Patent
Hwang

(10) Patent No.: US 11,445,502 B2
(45) Date of Patent: Sep. 13, 2022

(54) METHOD AND APPARATUS FOR RECEIVING TONE SIGNAL IN SYNCHRONOUS WIRELESS DISTRIBUTED COMMUNICATION SYSTEM

(71) Applicant: Electronics and Telecommunications Research Institute, Daejeon (KR)

(72) Inventor: Hyun Gu Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 89 days.

(21) Appl. No.: 16/913,617

(22) Filed: Jun. 26, 2020

(65) Prior Publication Data

US 2020/0413398 A1    Dec. 31, 2020

(30) Foreign Application Priority Data

Jun. 28, 2019 (KR) .......... 10-2019-0078165
Jun. 10, 2020 (KR) .......... 10-2020-0070230

(51) Int. Cl.
| | | |
|---|---|---|
| H04W 72/04 | (2009.01) | |
| H04J 3/16 | (2006.01) | |
| H04W 52/02 | (2009.01) | |
| H04W 74/08 | (2009.01) | |
| H04W 92/18 | (2009.01) | |

(52) U.S. Cl.
CPC ....... *H04W 72/0446* (2013.01); *H04J 3/1694* (2013.01); *H04W 52/0229* (2013.01); *H04W 74/08* (2013.01); *H04W 92/18* (2013.01)

(58) Field of Classification Search
CPC ......... H04W 72/0446; H04W 52/0229; H04W 74/08; H04W 92/18; H04J 3/1694; Y02D 30/70
See application file for complete search history.

(56) References Cited

U.S. PATENT DOCUMENTS

| | | |
|---|---|---|
| 2004/0208139 A1 | 10/2004 | Iwamura |
| 2011/0069650 A1 | 3/2011 | Singh et al. |
| 2014/0148100 A1 | 5/2014 | Kim et al. |
| 2015/0110012 A1 | 4/2015 | Bhushan et al. |

(Continued)

FOREIGN PATENT DOCUMENTS

| | | |
|---|---|---|
| CN | 106922221 A | 7/2017 |
| KR | 1020040039780 A | 5/2004 |
| WO | 2019156413 A1 | 8/2019 |

*Primary Examiner* — Gregory B Sefcheck
*Assistant Examiner* — Joshua Smith
(74) *Attorney, Agent, or Firm* — William Park & Associates Ltd.

(57) ABSTRACT

An operation method of a first terminal in a wireless distributed communication system using a synchronous TDMA scheme may comprise configuring a position of a first sub-slot in a frame of an information tone channel; detecting, by the first terminal in a sleep state, a first information tone signal transmitted from a second terminal in the first sub-slot; maintaining a state of the first terminal to the sleep state when the first information tone signal is not detected in the first sub-slot, and transitioning the state of the first terminal to a wake-up state when the first information tone signal is detected in the first sub-slot; and transmitting and receiving, by the first terminal having transitioned to the wake-up state, a data signal to and from the second terminal through a preconfigured data channel.

4 Claims, 4 Drawing Sheets

(56) References Cited

U.S. PATENT DOCUMENTS

| | | | |
|---|---|---|---|
| 2015/0230245 A1 | 8/2015 | Choi et al. | |
| 2015/0264658 A1 | 9/2015 | Kwak et al. | |
| 2015/0373651 A1 | 12/2015 | Ryu et al. | |
| 2016/0269486 A1 | 9/2016 | Gupta et al. | |
| 2016/0295511 A1* | 10/2016 | Qi | H04W 52/0229 |
| 2016/0302053 A1 | 10/2016 | Park et al. | |
| 2017/0251486 A1 | 8/2017 | Hu et al. | |
| 2018/0263058 A1* | 9/2018 | Yang | H04W 52/0235 |
| 2018/0324768 A1* | 11/2018 | Shaheen | H04W 72/042 |
| 2019/0297579 A1* | 9/2019 | Bhattad | H04W 72/14 |
| 2019/0387544 A1 | 12/2019 | Hwang | |
| 2020/0260418 A1* | 8/2020 | Xue | H04W 72/0446 |

\* cited by examiner

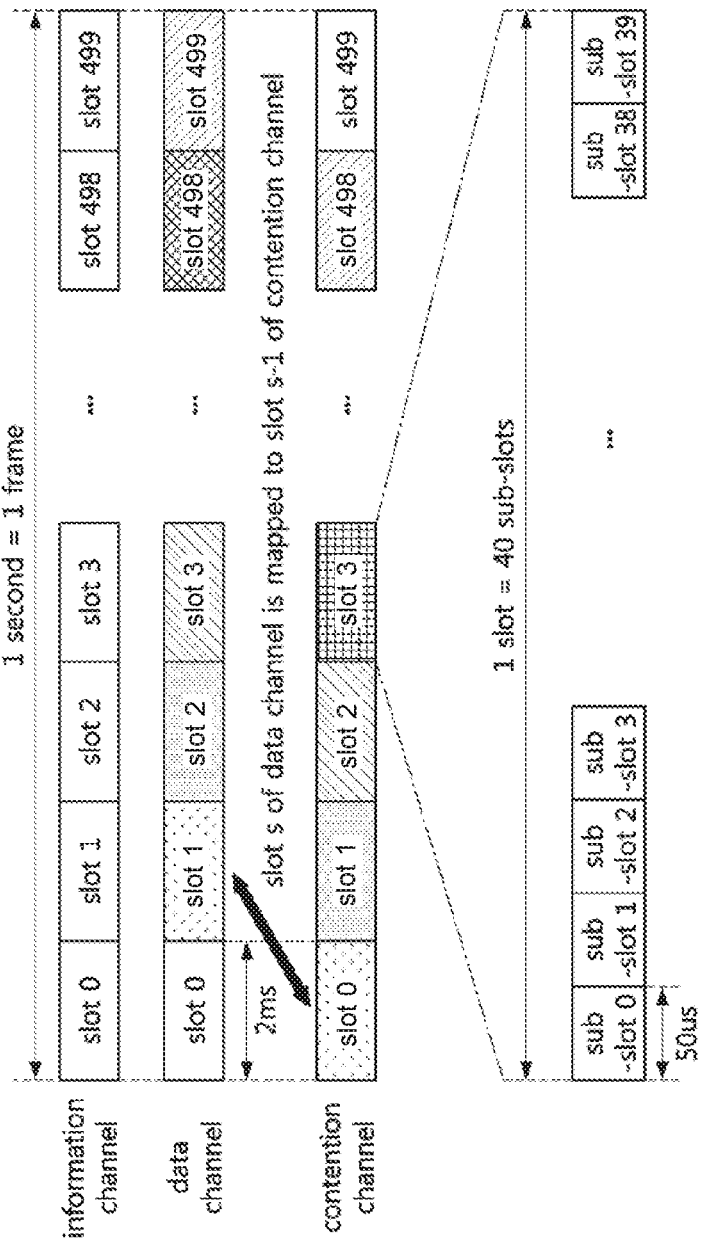

METHOD AND APPARATUS FOR RECEIVING TONE SIGNAL IN SYNCHRONOUS WIRELESS DISTRIBUTED COMMUNICATION SYSTEM

CROSS-REFERENCE TO RELATED APPLICATIONS

This application claims priority to Korean Patent Applications No. 10-2019-0078165 filed on Jun. 28, 2019, and No. 10-2020-0070230 filed on Jun. 10, 2020 with the Korean Intellectual Property Office (KIPO), the entire contents of which are hereby incorporated by reference.

BACKGROUND

1. Technical Field

The present disclosure relates generally to operations of a terminal in a wireless distributed communication system using a synchronous time division multiple access (TDMA) scheme, and more specifically, to methods for reducing power consumption of a terminal through reception configuration using an information tone signal.

2. Related Art

A synchronous wireless distributed communication network is a type of a direct communication system between terminals, and in the synchronous wireless distributed communication system, a signal from one terminal can be directly transmitted to another terminal without going through a base station. Accordingly, the synchronous wireless distributed communication network may not include a base station, and terminals of the synchronous wireless distributed communication network may not depend on control services of the base station. Therefore, when providing a communication service through the synchronous wireless distributed communication network, cost burdens on users can be reduced.

Such the synchronous wireless distributed communication scheme may be a next-generation communication scheme that can be widely used in various fields such as direct communication between drones, direct communication between vehicles, direct communication between smartphones, and direct communication between smartphones and things.

In general, in a central control type communication such as long-term evolution (LTE), a base station allocates and controls all resources. Also, a sleep mode operation of a terminal is also managed by the base station. A mobile communication modem of the terminal may perform a quick paging operation in which it receives a paging signal at a preconfigured position in a channel while receiving signals of the base station, and transitions to a wake-up state. However, since there is no base station (i.e., control station) in the synchronous wireless distributed communication network, the terminals should allocate and occupy radio communication resources by themselves, and transition from the sleep state to the wake-up state by themselves.

The present disclosure describes a power saving method in the synchronous wireless distributed communication system, which is similar to the quick paging used in the central control scheme such as the LTE. Specifically, the present disclosure describes a method for power saving operation of a distributed terminal using an information tone reception configuration. When exemplary embodiments of the present disclosure are applied to a smart phone, it is assumed that the smart phone is equipped with a synchronous wireless distributed communication modem in addition to the mobile communication modem such as the LTE. In addition to performing the sleep mode operation of the LTE communication modem, the smart phone can additionally perform the sleep mode operation of the synchronous wireless distributed communication modem to reduce battery consumption.

SUMMARY

Accordingly, exemplary embodiments of the present disclosure provide an operation method of a wireless distributed terminal using a synchronous TDMA scheme, which can reduce power consumption by using an information tone channel in a synchronous wireless distributed communication system.

According to an exemplary embodiment of the present disclosure, an operation method of a first terminal in a wireless distributed communication system using a synchronous TDMA scheme may comprise: configuring a position of a first sub-slot in a frame of an information tone channel; detecting, by the first terminal in a sleep state, a first information tone signal transmitted from a second terminal in the first sub-slot; maintaining a state of the first terminal to the sleep state when the first information tone signal is not detected in the first sub-slot, and transitioning the state of the first terminal to a wake-up state when the first information tone signal is detected in the first sub-slot; and transmitting and receiving, by the first terminal having transitioned to the wake-up state, a data signal to and from the second terminal through a preconfigured data channel.

The information tone channel may be a tone channel in which a preconfigured meaning is mapped to each of sub-slots constituting the frame, and may be a channel having a different center frequency from the data channel.

The position of the first sub-slot may be configured based on identification information of the first terminal.

The position of the first sub-slot may be configured by further reflecting information on a time when the information tone signal is transmitted and received in the information tone channel.

The position of the first sub-slot may be configured based on a position preconfigured by the wireless distributed communication system using the synchronous TDMA scheme.

The operation method may further comprise, when the information tone signal is detected in the first sub-slot, transmitting a second information tone signal to the second terminal in a second sub-slot preconfigured in the information tone channel.

According to another exemplary embodiment of the present disclosure, a first terminal in a wireless distributed communication system using a synchronous TDMA scheme may comprise a processor; a memory electronically communicating with the processor; and instructions stored in the memory, wherein when executed by the processor, the instructions cause the first terminal to: configure a position of a first sub-slot in a frame of an information tone channel; detect, by the first terminal in a sleep state, a first information tone signal transmitted from a second terminal in the first sub-slot; maintain a state of the first terminal to the sleep state when the first information tone signal is not detected in the first sub-slot, and transition the state of the first terminal to a wake-up state when the first information tone signal is detected in the first sub-slot; and transmit and receive, by the first terminal having transitioned to the wake-up state, a data signal to and from the second terminal through a preconfigured data channel.

The information tone channel may be a tone channel in which a preconfigured meaning is mapped to each of sub-slots constituting the frame, and may be a channel having a different center frequency from the data channel.

The position of the first sub-slot may be configured based on identification information of the first terminal.

The position of the first sub-slot may be configured by further reflecting information on a time when the information tone signal is transmitted and received in the information tone channel.

The position of the first sub-slot may be configured based on a position preconfigured by the wireless distributed communication system using the synchronous TDMA scheme.

The instructions may further cause the first terminal to, when the information tone signal is detected in the first sub-slot, transmit a second information tone signal to the second terminal in a second sub-slot preconfigured in the information tone channel.

According to the exemplary embodiments of the present disclosure, in the synchronous wireless distributed communication system, the wireless distributed terminal using the synchronous TDMA scheme can efficiently use power by transmitting and receiving information tone signals having different meanings according to the respective slots or sub-slots constituting the frame. According to the exemplary embodiments of the present disclosure, in the synchronous wireless distributed communication system, the terminal using the synchronous TDMA scheme can configure the position (number) of the sub-slot based on identification information of the terminal, transition to the wake-up state only when an information tone signal is detected in a configured sub-slot position, and maintain the sleep state when a tone signal is not detected at the configured sub-slot position, so that the power can be efficiently used.

BRIEF DESCRIPTION OF DRAWINGS

FIG. 3A is a conceptual diagram illustrating an exemplary embodiment of a structure of a synchronous TDMA frame.

DETAILED DESCRIPTION OF THE EMBODIMENTS

Figure 1:
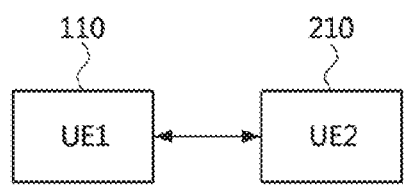
FIG. 1 is a conceptual diagram illustrating a first exemplary embodiment of a communication network.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication network.

Referring to FIG. 1, a communication network may include a first terminal (e.g., first user equipment (UE1)) 110 and a second terminal (e.g., UE2) 210. The communication network of FIG. 1 may be a synchronous wireless distributed communication network. The synchronous wireless distributed communication network of FIG. 1 may not include a separate base station. That is, the terminals of the synchronous wireless distributed communication network may not depend on control services of the base station.

When there is a frame to be transmitted to the second terminal 210, the first terminal 110 may directly transmit the corresponding frame to the second terminal 210 and directly receive a frame from the second terminal 210. That is, the first terminal 110 and the second terminal 210 may transmit and receive frames through device-to-device (D2D) communication.

The communication node (e.g., terminal, etc.) constituting the above-described communication network may support a communication protocol based on a time division multiple access (TDMA) scheme.

Among the communication nodes, the terminal may be referred to as a terminal, an access terminal, a mobile terminal, a station, a mobile station, a node, a device, or the like. The communication node may have the following structure.

Figure 2:
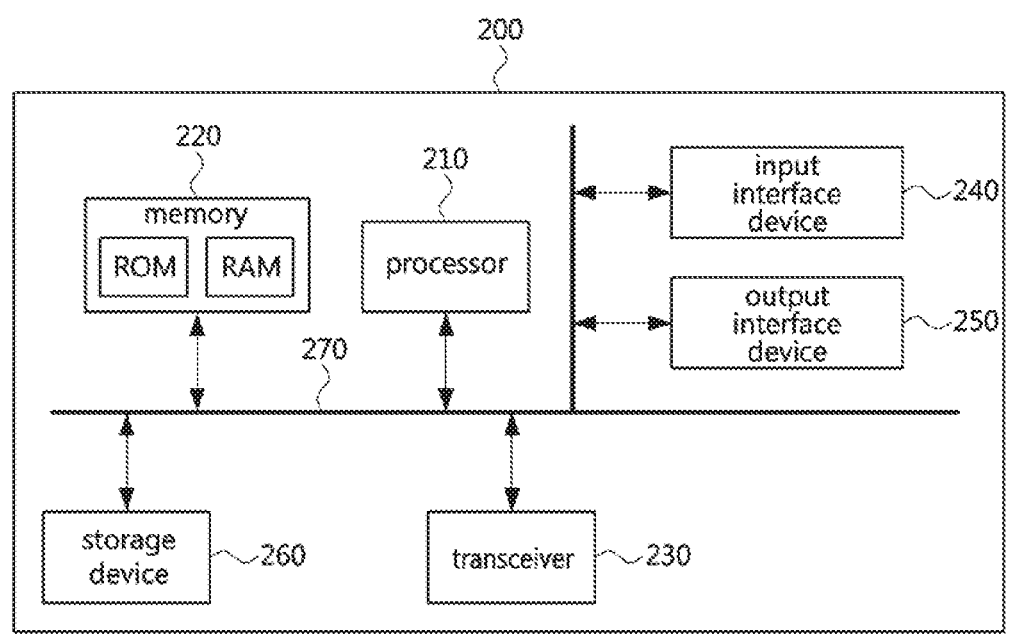
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Exemplary embodiments of the present disclosure are assumed to operate in a synchronous wireless distributed communication system using a synchronous TDMA scheme. For example, they are assumed to operate in a communication system in which a data channel and a tone channel coexist. A center frequency of the data channel may be different from a center frequency of the tone channel. Accordingly, when implemented through general hardware, an independent radio frequency (RF) module is required for each channel. The tone channel may be classified into four types—a contention tone channel, an information tone channel, a wake tone channel, and a mixed tone channel. The exemplary embodiments of the present disclosure may be utilized for the information tone channel, the mixed tone channel, or the contention tone channel. However, when a portion of slots of the tone channel of the four types is configured as an information tone slot, the exemplary embodiments of the present disclosure may be applicable.

A synchronous wireless distributed communication modem may be mounted in a smart phone, for example. In this case, the smart phone may perform a sleep mode operation on its mobile communication modem to reduce battery consumption. At the same time, the synchronous wireless distributed communication modem may also perform a sleep mode operation proposed by the present disclosure to reduce battery consumption.

Figure 3B:
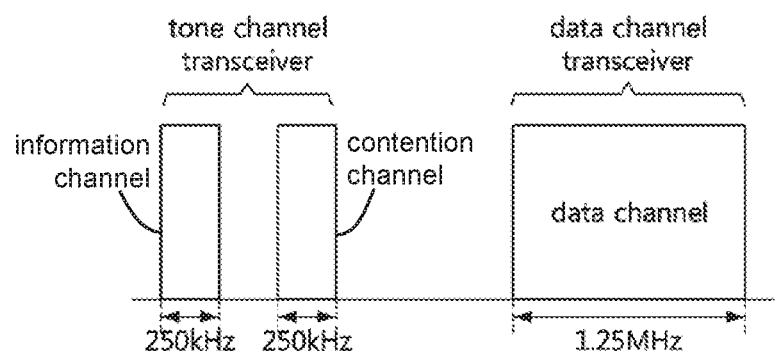
FIG. 3B is a conceptual diagram illustrating an exemplary embodiment of a synchronous TDMA channel band.

FIG. 3A is a conceptual diagram illustrating an exemplary embodiment of a structure of a synchronous TDMA frame, and FIG. 3B is a conceptual diagram illustrating an exemplary embodiment of a synchronous TDMA channel band.

Referring to FIGS. 3A to 3B, terminals of the synchronous wireless distributed communication network may perform communication with other terminals through the data channel, the contention tone channel, and the information tone channel. The data channel and the contention tone channel may be mapped to each other. That is, in the synchronous wireless distributed communication system using the TDMA scheme, the terminals may perform contention to acquire a transmission opportunity on the contention tone channel mapped to the data channel, and transmit a data signal through the data channel mapped to the contention tone channel. In addition, the information tone channel may be a channel for transmitting separate information independently from the data channel and the contention tone channel. That is, slots and/or sub-slots of the information tone channel may be mapped to preconfigured meanings, and the tone signals transmitted through different slots and/or sub-slots may have different meanings.

According to an exemplary embodiment of the present disclosure, the length of one TDMA frame of the data channel and the tone channel in the time domain may be 1 second. The TDMA frame may be composed of 500 slots. In addition, it is assumed that one slot of the tone channel may further include 40 sub-slots, and the information tone channel and the contention tone channel have a common frame and slot structure. Therefore, the time length of one slot may be 2 ms, and the time length of one sub-slot may be 50 μs. One tone sub-slot may be composed of a signal transmission period for transmitting a signal and a guard period. For example, a signal transmission period among the tone sub-slots of FIG. 3 may have a length of 40 μs. In the below description, a signal transmitted through one sub-slot of the information tone channel may be referred to as an 'information tone signal'. Referring to FIG. 3A, the data channel and the contention tone channel mapped to the data channel may exist. In addition, there may be an information tone channel used in the exemplary embodiments of the present disclosure. FIG. 3B illustrates tone channels and data channels in the frequency domain.

The terminal generating a tone signal may generate the tone signal without going through a separate encoding/decoding process. Therefore, the terminal detecting the tone signal may detect the tone signal using simple hardware.

According to an exemplary embodiment of the present disclosure, the terminal can reduce power consumption by transmitting and receiving the information tone signal, which is a tone signal having a unique meaning.

According to an exemplary embodiment of the present disclosure, the terminal (e.g., smart phone, etc.) equipped with the synchronous wireless distributed communication modem may maintain a sleep state during normal times. In general, each of the terminals may include a mobile communication modem, and the mobile communication modem may transition from a sleep state to a wake-up state by the base station. However, since the synchronous wireless distributed communication modem operates regardless of the base station (i.e., control station), it may not be woken up by the base station.

Accordingly, in an exemplary embodiment of the present disclosure, it will be described that a synchronous wireless distributed communication modem mounted on one smartphone wakes up a synchronous wireless distributed communication modem mounted on another smartphone. The terminal may operate in the sleep state to prevent the synchronous wireless distributed communication modem from continuously performing demodulation on the data channel.

Accordingly, according to an exemplary embodiment of the present disclosure, in order to minimize the power consumption of the terminal, the distributed communication modem of the terminal may maintain the sleep state when it does not receive a signal, and transition to the wake-up state by an information tone signal from another terminal. The specific operation of the terminal transitioning to the wake-up state by the information tone signal from another terminal may be as described below.

Figure 4:
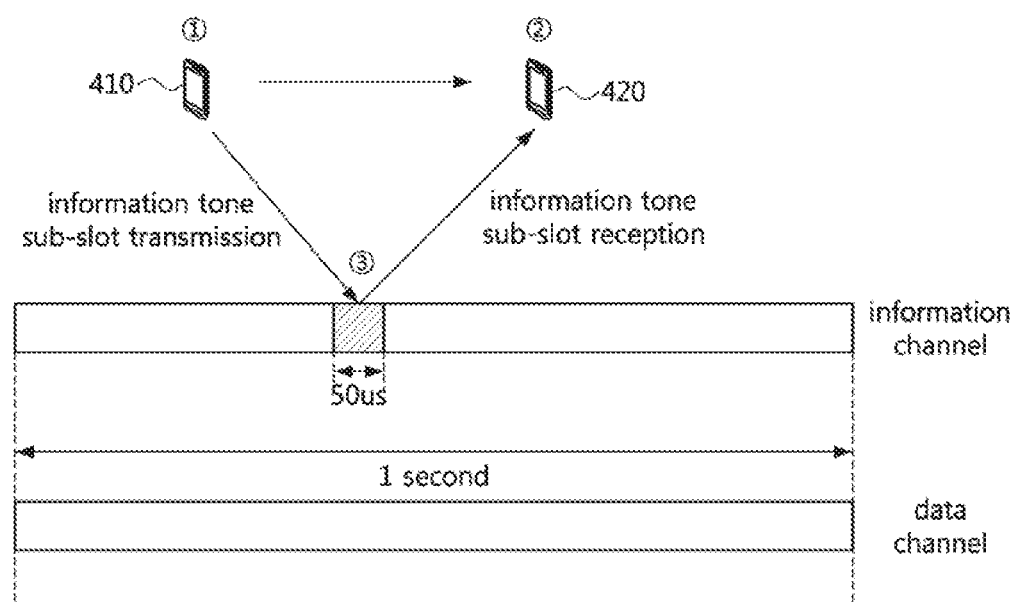
FIG. 4 is a conceptual diagram illustrating a first exemplary embodiment of an operation in which a terminal including a synchronous wireless distributed communication modem wakes up a synchronous wireless distributed modem of another terminal in a synchronous wireless distributed communication network.

FIG. 4 is a conceptual diagram illustrating a first exemplary embodiment of an operation in which a terminal including a synchronous wireless distributed communication modem wakes up a synchronous wireless distributed modem of another terminal in a synchronous wireless distributed communication network.

Referring to FIG. 4, a communication network may include a plurality of terminals 410 and 420. Each of the terminals 410 and 420 of the communication network may further include a synchronous wireless distributed communication modem. The synchronous wireless distributed modem of each of the terminals 410 and 420 may maintain the sleep state in a remaining period(s) excluding a preconfigured period in the frame of the information tone channel. The synchronous wireless distributed modem of the terminal in the sleep state may detect a tone signal transmitted by another terminal through one sub-slot which is the preconfigured period in the frame of the information tone channel.

That is, while maintaining the sleep state, the terminal may detect the information tone signal through the preconfigured sub-slot in the frame of the information tone channel. According to an exemplary embodiment of the present disclosure, the length of the sub-slot used for transmitting the information tone signal may be 50 μs. Therefore, the terminal may be woken up only for 1/20,000 second every second. In particular, since the terminal does not decode the information tone signal, and simply detects presence or absence of the information tone signal, the terminal may consume low power.

Referring to FIG. 4, in order to wake up the second terminal 420, the first terminal 410 may transmit the information tone signal at an information tone signal reception position of the second terminal 420. The second terminal 420 may detect the tone signal from the first terminal 410 at the preconfigured information tone signal reception position. The second terminal 420 detecting the tone signal from the first terminal 410 may transition from the sleep state to the wake-up state. According to the scheme of FIG. 4, the terminal including the synchronous wireless distributed modem may maintain the sleep state for the period(s) excluding the preconfigured period in the frame of the information tone channel, and then transition to the wake-up state only when the tone signal is detected in the preconfigured period.

However, the first terminal 410 may not know the position of the information tone sub-slot preconfigured by the second terminal 420. That is, the first terminal 410 may not know in which of the 20,000 sub-slots included in the frame of the information tone channel the information tone signal should be transmitted. Even when the candidate positions of the information tone sub-slots for wakeup are limited to 100 positions, the problem may still occur. Accordingly, the terminals 410 and 420 may determine the position of the sub-slot to receive the tone signal in the frame of the information tone channel, based on the unique identification information of the terminal.

Figure 5:
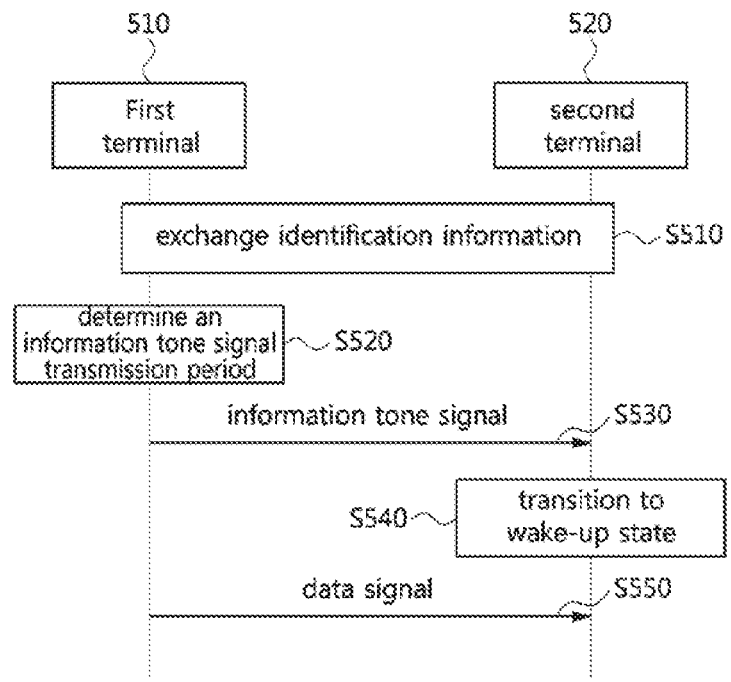
FIG. 5 is a sequence diagram illustrating a first exemplary embodiment of an operation in which a terminal including a synchronous wireless distributed communication modem wakes up a synchronous wireless distributed modem of another terminal in a synchronous wireless distributed communication network.

FIG. 5 is a sequence diagram illustrating a first exemplary embodiment of an operation in which a terminal including a synchronous wireless distributed communication modem wakes up a synchronous wireless distributed modem of another terminal in a synchronous wireless distributed communication network.

Referring to FIG. 5, a synchronous wireless distributed communication network may include a plurality of terminals 510 and 520. Each of the terminals 510 and 520 of the synchronous wireless distributed communication network may include a synchronous wireless distributed communication modem.

The first terminal 510 may exchange identification information with the second terminal 520. The first terminal 510 may obtain unique identification information of the second terminal 520 from the second terminal 520 (S510). According to an exemplary embodiment of the present disclosure, the terminals 510 and 520 may be smartphones, and the unique identification information of each of the terminals 510 and 520 may be a phone number of each of the terminals 510 and 520. That is, the identification information may be exchanged through a person.

Each of the terminals 510 and 520 may determine a period for transmitting and receiving the information tone signal in the frame of the information tone channel by using the unique identification information (S520). That is, the first terminal 510 may determine the information tone signal reception period of the second terminal 520 in the frame of the information tone channel by using the unique identification information obtained from the second terminal 520 (S520). The first terminal 510 may transmit the information tone signal to the second terminal 520 in the information tone signal reception period of the second terminal 520 (S530).

The second terminal 520 maintaining the sleep state may use the unique identification information of the second terminal 520 to configure the period to receive the information tone signal in the frame of the information tone channel. In the information tone signal reception period, the second terminal 520 may detect the information tone signal from the first terminal 510. The second terminal 520 receiving the information tone signal from the first terminal 510 may transition the operation state from the sleep state to the wake-up state (S540).

Therefore, when the first terminal 510 knows the unique identification information of the second terminal 520 (e.g., phone number of the second terminal 520, etc.) in advance, the first terminal 510 may wake up the second terminal 520 by transmitting the information tone signal in the sub-slot of the preconfigured position of the second terminal 520.

The first terminal 510 that has transmitted the information tone signal to the second terminal 520 may transmit a data signal to the second terminal 520 through a preconfigured data channel (S550). As shown in FIG. 3B, the data channel may be a separate channel having a center frequency different from that of the information tone channel. In addition, the woken-up second terminal 520 may receive the data signal from the first terminal 510 through the data channel (S550). The second terminal 520 may perform an operation according to the data signal from the first terminal 510. Accordingly, when the position of the sub-slot for receiving the tone signal in the frame of the information tone channel is configured based on the unique identification information of the terminal, the terminals 510 and 520 may transition from the sleep mode to the wake-up mode, and may be connected to a counterpart synchronous wireless distributed terminal.

The terminals 510 and 520, which configure the position of the sub-slot for receiving the information tone signal in the frame of the information tone channel based on the unique identification information of the terminal, may configure the position for receiving the information tone signal by further reflecting information on transmission/reception time of the information tone signal.

For example, the second terminal 520 may reconfigure the position of the sub-slot for receiving the information tone signal every frame of 1 second by using the information one the transmission/reception time of the information tone signal such as year, month, day, hour, minute, and second. Accordingly, the terminals 510 and 520 may secure security in transmitting and receiving the information tone signal. In addition, each of the terminals 510 and 520 may equally distribute the positions for receiving the information tone signal by reconfiguring the position for receiving the information tone signal for each frame. Even when the position of the sub-slot for transmitting and receiving the information tone signal is reconfigured for each frame, the first terminal 510 may calculate the position of the sub-slot for transmitting and receiving the information tone signal if the first terminal 510 have knowledge of the mobile communication number and the current time.

Figure 6:
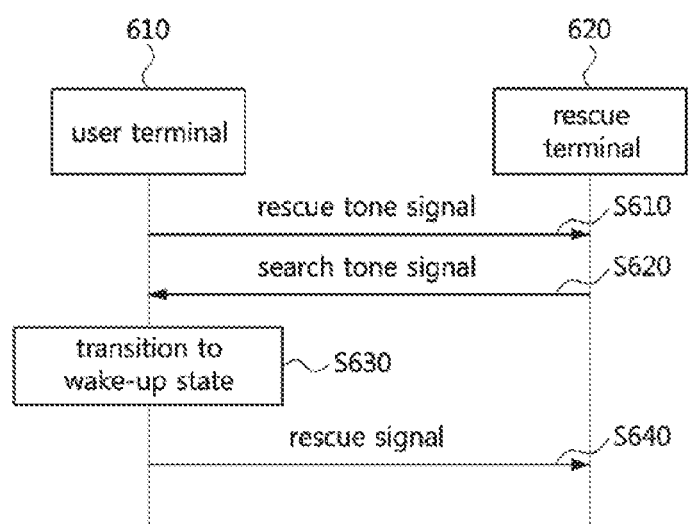
FIG. 6 is a sequence diagram illustrating a second exemplary embodiment of an operation in which a terminal including a synchronous wireless distributed communication modem wakes up a synchronous wireless distributed modem of another terminal in a synchronous wireless distributed communication network.

FIG. 6 is a sequence diagram illustrating a second exemplary embodiment of an operation in which a terminal including a synchronous wireless distributed communication modem wakes up a synchronous wireless distributed modem of another terminal in a synchronous wireless distributed communication network.

Referring to FIG. 6, a synchronous wireless distributed communication network may include a plurality of terminals. Each of the terminals of the communication network may include a synchronous distributed communication modem. The exemplary embodiment of FIG. 6 may be a scenario for a situation where a user terminal 710 is a victim terminal. Accordingly, the first terminal of the communication network may be the user terminal 610, and the second terminal of the communication network may be a rescue terminal 620.

According to the exemplary embodiment of FIG. 6, under a special circumstance, the user terminal 610 may fix a position for transmitting and receiving the information tone signal. For example, in a situation where a user drifts in the sea, when a battery of the user terminal 610 has a sufficient remaining capacity, the user terminal 610 may transmit a rescue tone signal, which is transmitted in a sub-slot having a fixed position in the frame of the channel, and a rescue signal, which is a data signal including the user's information. The user terminal 610 may transmit the rescue tone signal through the tone channel, and transmit the rescue signal through the data channel.

However, when the user terminal 610 periodically transmits the data signal including its position information, the user terminal 610 may rapidly consume power. Therefore, when the battery of the user terminal 610 has an insufficient remaining capacity, the user terminal 610 may transmit only the rescue tone signal in the sub-slot of the fixed position in the frame of the channel, thereby minimizing power consumption. In this case, the rescue tone signal, which is transmitted by the user terminal 610, may be transmitted to the rescue terminal 620 (e.g., rescue drone, etc.) for searching the position of the victim.

On the other hand, the rescue terminal 620 may transmit a search tone signal, which is a type of information tone signal, in a sub-slot of a fixed position in the frame of the channel (S620). The search tone signal may be transmitted to the user terminal 610 of the victim. The rescue terminal 620 may continuously transmit the search tone signal through the preconfigured sub-slots of the information tone channel during rescue flight. Alternatively, the rescue terminal 620 may transmit the search tone signal through the preconfigured sub-slots of the information tone channel for a period of time from the time when the rescue tone signal is received from the user terminal 610.

Therefore, when the search tone signal is used, the user terminal 610 may maintain the sleep state before detecting the search tone signal from the rescue terminal 620, and transition from the sleep state to the wake-up state after detecting the search tone signal from the rescue terminal 620.

During the sleep state, the user terminal 610 may or may not transmit the rescue tone signal. The user terminal 610 that transmits the rescue tone signal during the sleep state may transmit a rescue signal, which is a data signal including user information, for a certain period of time only when detecting the search tone signal.

On the other hand, when the user terminal 610 does not transmit the rescue tone signal during the sleep state, the user terminal 610 may transmit the rescue signal, which is a data signal including user information, and the rescue tone signal for a certain period of time only when detecting the search tone signal.

As such, the user terminal 610 including the synchronous wireless distributed modem may perform only the operation of transmitting the rescue tone signal and the operation of receiving the search tone signal from the rescue terminal 620 to conserve battery. In the remaining period(s), the terminal may maintain the sleep state. Therefore, the user terminal may maintain the sleep state as long as possible to minimize power consumption.

In addition, the user terminal 610 may transmit the data signal including position information to the rescue terminal 620 only when the search tone signal from the rescue terminal 620 is detected (S630), thereby preventing unnecessary power consumption due to continuous data signal transmission.

The rescue terminal 620 may receive signals including the rescue tone signal from the outside. In particular, the rescue terminal 620 may receive the rescue tone signal through the sub-slot of a preconfigured position in the frame of the channel (S610). The rescue terminal 620 may maintain the sleep state in period(s) other than the preconfigured sub-slot in the frame of the channel, and may transition to the wake-up state in the preconfigured sub-slot. The rescue terminal 620 may reduce power consumption by continuously receiving only the rescue tone signal at the preconfigured position every frame.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first terminal in a wireless distributed communication system using a synchronous time division multiple access (TDMA) scheme, the operation method comprising:
    configuring a position of a first sub-slot in a frame of an information tone channel,
    wherein the position of the first sub-slot is configured based on a mobile communication number of the first terminal and information on a time that an information tone signal is transmitted and received in the information tone channel;
    sensing for, by the first terminal in a sleep state, a first information tone signal transmitted from a second terminal in the first sub-slot;
    maintaining a state of the first terminal to the sleep state when the first information tone signal is not detected in the first sub-slot, and transitioning the state of the first terminal to a wake-up state when the first information tone signal is detected in the first sub-slot; and
    transmitting and receiving, by the first terminal having transitioned to the wake-up state, a data signal to and from the second terminal through a preconfigured data channel,
    wherein the information tone channel is a tone channel in which a preconfigured information is mapped to each of sub-slots constituting the frame and a center frequency of the information tone channel is configured to be different from a center frequency for the data channel.

2. The operation method according to claim 1, further comprising, when the information tone signal is detected in the first sub-slot, transmitting a second information tone signal to the second terminal in a second sub-slot preconfigured in the information tone channel.

3. A first terminal in a wireless distributed communication system using a synchronous time division multiple access (TDMA) scheme, the first terminal comprising:
    a processor;
    a memory electronically communicating with the processor; and
    instructions stored in the memory,
    wherein when executed by the processor, the instructions cause the first terminal to:
    configure a position of a first sub-slot in a frame of an information tone channel, wherein the position of the first sub-slot is configured based on a mobile communication number of the first terminal and information on a time that an information tone signal is transmitted and received in the information tone channel;
    sense for, by the first terminal in a sleep state, a first information tone signal transmitted from a second terminal in the first sub-slot;
    maintain a state of the first terminal to the sleep state when the first information tone signal is not detected in the first sub-slot, and transition the state of the first terminal to a wake-up state when the first information tone signal is detected in the first sub-slot; and
    transmit and receive, by the first terminal having transitioned to the wake-up state, a data signal to and from the second terminal through a preconfigured data channel,
    wherein the information tone channel is a tone channel in which a preconfigured information is mapped to each of sub-slots constituting the frame and a center frequency of the information tone channel is configured to be different from a center frequency for the data channel.

4. The first terminal according to claim 3, wherein the instructions further cause the first terminal to, when the information tone signal is detected in the first sub-slot, transmit a second information tone signal to the second terminal in a second sub-slot preconfigured in the information tone channel.

* * * * *